May 4, 1943.  E. J. PANISH  2,318,010
VALVE CONTROL
Filed April 9, 1940  3 Sheets-Sheet 1
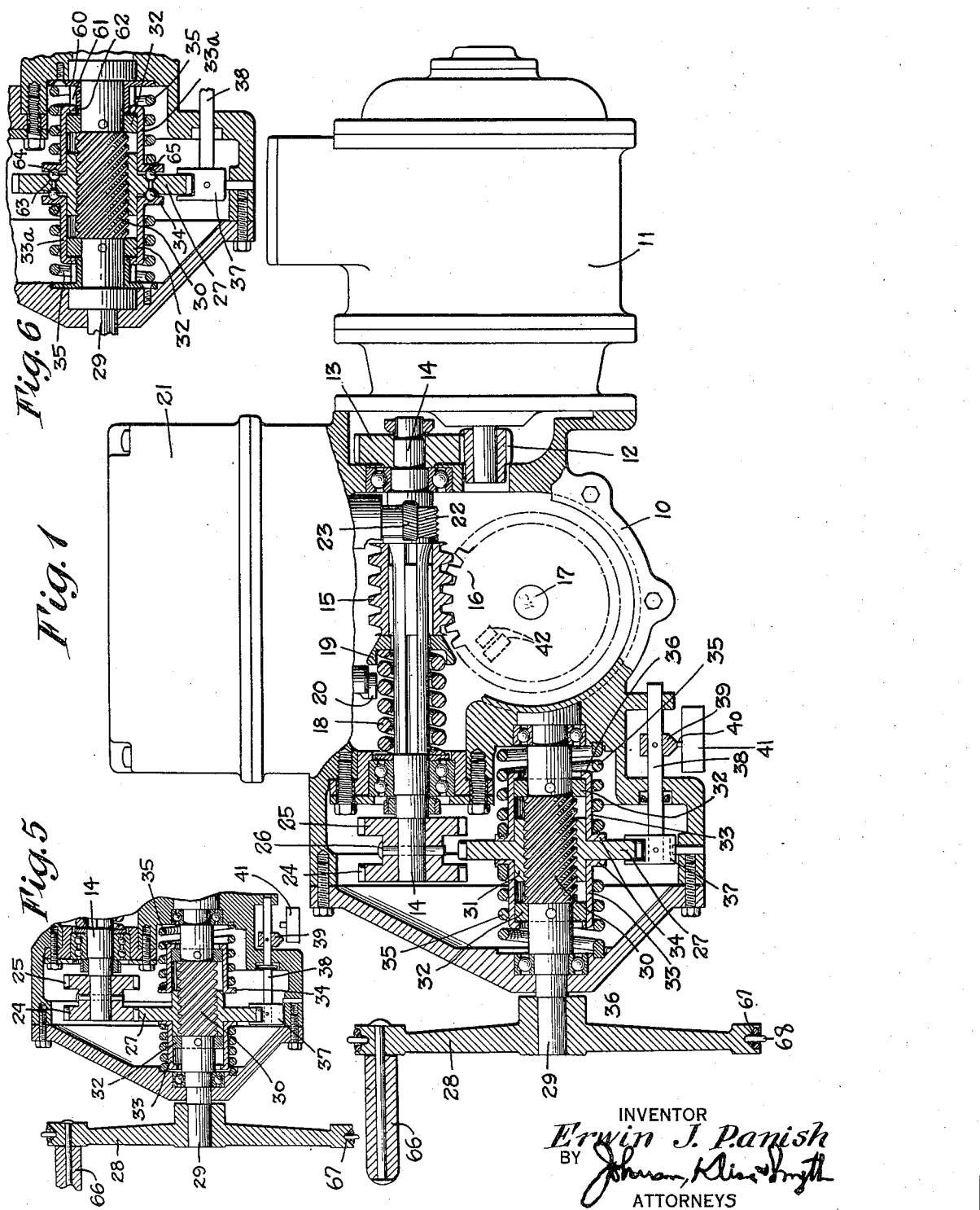
INVENTOR
Erwin J. Panish
BY
ATTORNEYS

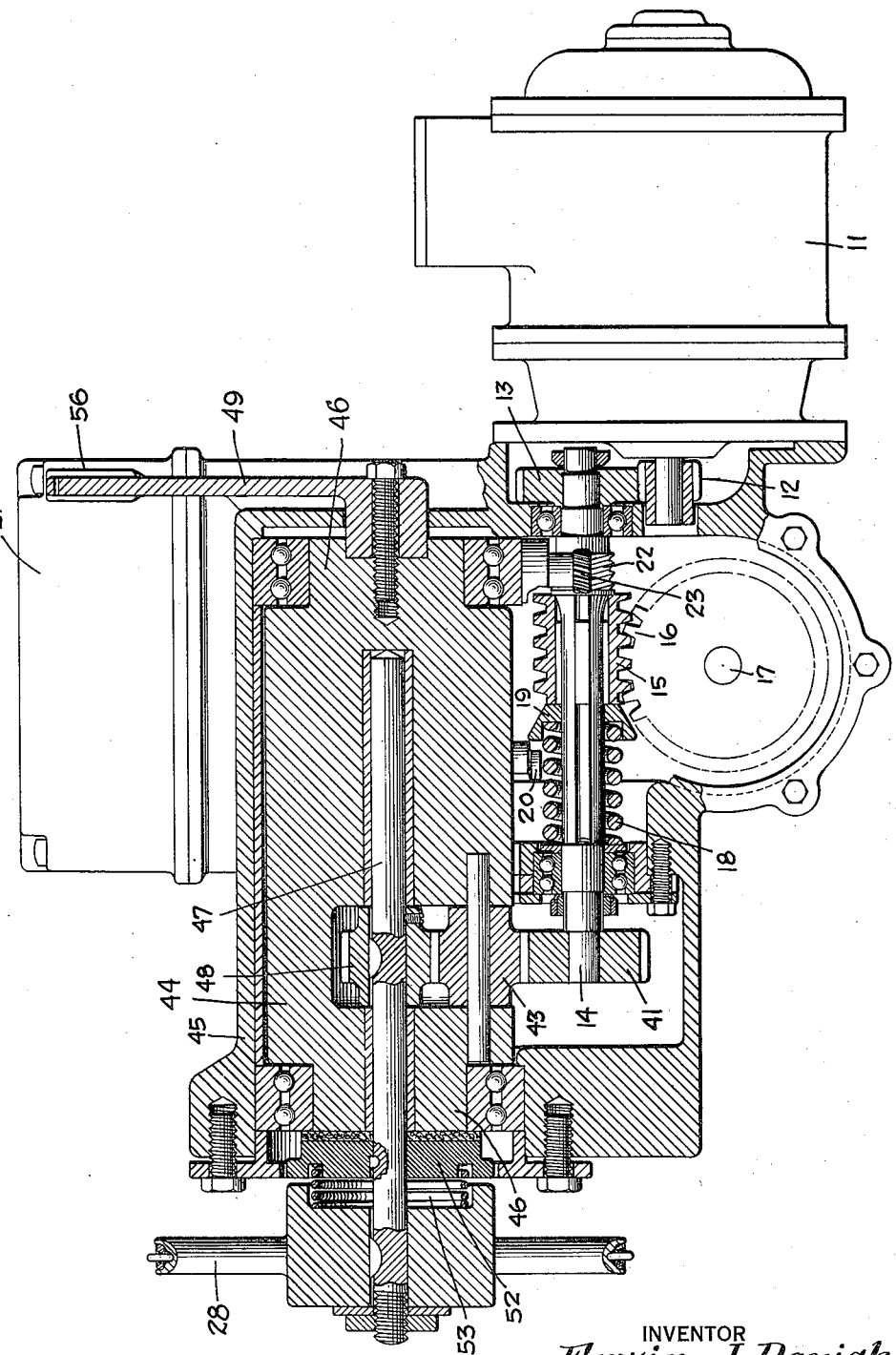

May 4, 1943.  E. J. PANISH  2,318,010
VALVE CONTROL
Filed April 9, 1940  3 Sheets-Sheet 3
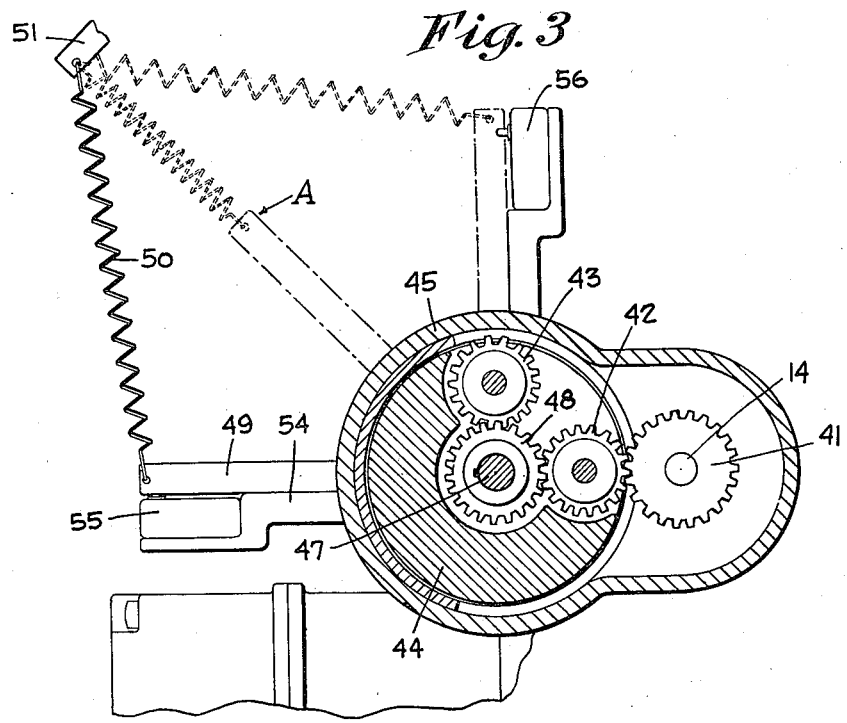
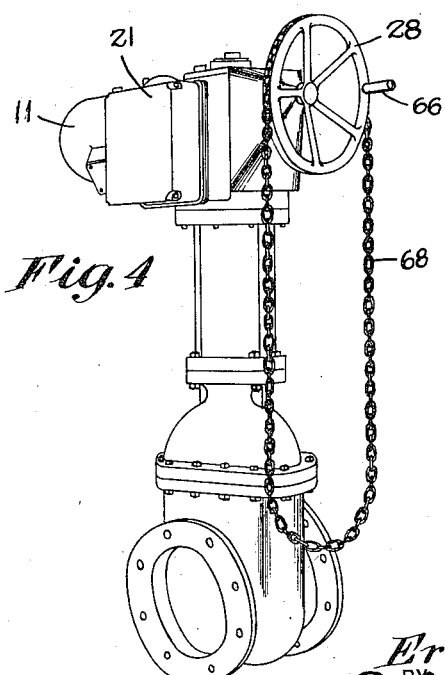
INVENTOR
Erwin J. Panish
BY
ATTORNEYS Patented May 4, 1943

2,318,010

UNITED STATES PATENT OFFICE 2,318,010

VALVE CONTROL

Elwin J. Panish, Bridgeport, Conn., assignor to Philadelphia Gear Works, Inc., Philadelphia, Pa., a corporation of Pennsylvania Application April 9, 1940, Serial No. 328,645

3 Claims. (Cl. 74—407)

This invention relates to power-operated valve control devices, and, more particularly, to means for permitting manual operation of the valve with convenience and safety.

Such devices are employed to automatically open and close valves and the like usually from a remote point or station. Yet, means must be provided for opening and closing the valve by hand in case of an emergency or the failure of the motor or other power normally used.

For this purpose, valve controls are usually provided with handwheels or with wildcat wheel and chains when the location of the handwheel is so high or so low that it cannot be reached conveniently. It is dangerous to permit the rotation of the wheel when the valve is being operated automatically by power, and hence it is the practice to provide clutching means which must first be operated by hand to connect the wheel to the valve-actuating mechanism before the rotation of the wheel can be effective to open or close the valve.

This clutching operation should also render impossible the power operation of the valve while under manual control. Yet, if this be done, and the operator fails to restore the clutching mechanism after the manual operation of the valve is completed, the operator at a remote point, such as an emergency station, could not promptly open or close the valve as might be necessary to save life and property.

Besides, in the present practice of manually clutching the manually operated wheel, where the control is inaccessible to direct manual operation and a wildcat and chain are needed, it is very difficult to operate such a clutch.

To overcome these difficulties, the present invention provides manually operated means for valve controls in which the manual rotation of the handwheel (or wildcat) automatically causes its connection to the valve-actuating mechanism, and, likewise, the manual release of the handwheel (or wildcat) automatically causes its disconnection. Preferably, although not essentially, these connecting and disconnecting operations of the handwheel automatically render the power operation of the valve impossible until the operator releases manual control of the handwheel.

In the embodiments of this invention illustrated and described herein as exemplary thereof, the mechanism is so arranged that the initial rotation of the wheel or pulley by hand, acting against a return spring, causes the handwheel or pulley to be clutched or geared to the actuating mechanism. The continued rotation of the wheel operates the valve, and, immediately upon the operator releasing his grasp of the handwheel, or the operating chain in case a pulley is used, the wheel, under the action of the return spring, receives retrograde motion and becomes disengaged from the actuating mechanism.

Preferably, the mechanism is so arranged that so long as the hand-operated wheel is connected to the actuating mechanism, the automatic operation of the valve is prevented to safeguard the person manually operating the valve. This may safely be done with the present invention, for, as soon as the operator releases his hold on the handwheel, it returns, and this reestablishes the automatic control of the valve.

In some types of valve controls, such as the type in which the valve is seated under a predetermined and limited torque as controlled by a predetermined spring pressure, when the valve is closed under power, the driving train is constantly undr load, and, in such cases, it is impractical to declutch part of the driving train from another part so as to permit hand operation.

According to the present invention, this difficulty is obviated, and hand-opening of the valve closed by torque-responsive power means is permitted by so arranging the manually operable mechanism that the valve-actuating mechanism may be operated to open the valve, and to close it too for that matter, without interrupting the train of driving connections between the motor and the valve. In other words, by the present invention, the valve-actuating mechanism may be operated by hand without declutching the operating motor from the valve.

Other features and advantages will hereinafter appear.

In the accompanying drawings:

Figure 1 is a side elevation of a torque-responsive valve-control mechanism with portions of the casing broken away to show the present invention and the valve-actuating mechanism with which it cooperates.

Fig. 2 is a view similar to Fig. 1, but showing another embodiment of the invention, in which the handwheel is connected to the actuating mechanism by arcuate movement of the gears driven by the handwheel.

Fig. 3 is an end view of the parts shown in Fig. 2.

Fig. 4 is a perspectivve view of a valve with valve control attached and operated by a wildcat pulley or chain.

Fig. 5 is a sectional view of part of the mechanism shown in Fig. 1, showing the manually operated gear in mesh with one of the gears connected with the actuating mechanism when the handwheel is under manual operation.

Fig. 6 is a view similar to Fig. 5, but showing a modified form of the invention.

As will appear below, the present invention is particularly advantageous in connection with valve control mechanisms of the torque-responsive type, such as shown in my prior patent No. 1,747,594, granted February 18, 1930, in which the driving train from the motor armature to the valve stem remains permanently coupled and movements of the valve are started and stopped solely by the closing and opening of the motor circuit. I have chosen, therefore, to disclose the present invention as used with this type of control.

It should be understood, however, that, in some important aspects of this invention, it is immaterial whether the driving train of connections remains continuous or is interrupted by the use of a clutch of any type between the motor and the valve. With the clutching and declutching types of controls, however, it is possible to avoid the loss of automatic control of the valve should the operator, who manually clutched the handwheel to the actuating mechanism, have forgotten to declutch it.

Hence, the present invention, with its provision for declutching the handwheel from the valve-actuating mechanism, as a result of the relinquishment of force manually applied thereto, may be advantageously employed even with valve controls in which the motor and valve are clutched and declutched in the normal operations.

Referring to both forms of the invention illustrated, the mechanism has a suitable housing 10 for enclosing and supporting the operating parts. On one side of the housing there is a motor 11 having a gear 12 which meshes with a gear 13 on a shaft 14 on which there is splined a worm 15 meshing with a worm-wheel 16 on the valve stem 17. When the motor is operated by controls (not shown) in one direction or the other, depending on whether the valve is to be opened or closed, the power is transmitted to the valve stem 17 to operate the valve. When the valve stops moving, as when hitting the seat or an obstruction, the worm-wheel 16 stops and this causes the worm 15 to travel ahead against the pressure of a torque-controlling spring 18 until a collar 19 advanced by the worm 15 strikes and moves a switch actuator 20 to open the motor control circuit. The pilot light circuit and the mechanical limit switch which is used to control the limit of movement of the valve in opening direction are controlled by suitable mechanism contained in the casing 21 which is operated by spiral gears 22 and 23. It will be understood, of course, that the worm 15 remains constantly in mesh with the worm-wheel 16 even though it travels slightly along the shaft 14 in tripping the switch lever 20.

When the valve is seated by power operation, the worm-wheel 15 remains in the position to which it has been moved axially and the spring 18 remains compressed, because the worm or worm-wheel are not overhauling. The whole driving train is, therefore, under full seating load, and it is impractical to provide a clutch or gear shifting arrangement whereby operation of the valve may be unclutched from the motor and clutched to the handwheel.

In the form of the invention shown in Fig. 1, the outer end of the worm shaft is provided with a pair of gears 24 and 25 permanently secured to the shaft by a pin 26. These gears 24 and 25 are spaced apart, and, in the space between them, there is located a gear 27 which is manually operated and which, when meshed with either the gear 24 or the gear 25, may turn the worm shaft 14, and through the worm 15 and worm-wheel 16 the valve stem 17.

The gear 27 is caused to move laterally from its normal inoperative position shown in Fig. 1 into mesh with either the gear 24 or the gear 25 by the manual rotation of a handwheel 28 on the exterior of the casing. This may be a conventional one, or one having its periphery shaped to receive a rope or chain as in Fig. 4, so that it may be manually operated from a nearby point when the valve control is not convenient to reach from the floor.

The wheel 28 is secured to the end of a shaft 29 on which there is a screw 30 on which is slidably mounted a nut 31 forming the hub for the gear 27.

At each end of the screw 30 there is a collar 32 fixed to the shaft 29, and at each side of the gear 27 there is a sleeve 33 riding on the exterior of the nut 31 and the collars 32. Each sleeve 33 has an outwardly extending flange 34 normally pressed against the adjacent face of the gear 27 by a spring 35 and an inwardly extending flange 36 adapted to overhang the adjacent collar 32. The outer ends of the springs 35 engage adjacent portions of the casing, and are bent to engage notches in the casing to keep the spring from turning. The inner ends of the springs are bent to engage notches in the flanges 34, and hence the spring tends to hold the sleeves 33 from turning. The springs 35, being equal in expansive force, hold the gear 27 normally located between and out of mesh with the gears 24 and 25.

There is normally slight clearance between the inwardly turned flanges 36 of one or the other of the sleeves 33 and the adjacent collars 32, so that there is always spring pressure on the gear 27 to frictionally hold it from turning until the teeth thereon have meshed with either the gear 24 or the gear 25. If the tension of the springs 35 is exactly balanced, the gear 27 will stand exactly midway between the gears 24 and 25, but if one spring should be slightly stronger than the other, the gear 27 will be located slightly closer to one of the gears 24 or 25 but not close enough to engage the same because its movement is limited by one of the collars 32 which is engaged by the inwardly turned flange 36.

When, however, the handwheel is rotated by hand, the gear 27 and nut 31, being held by the pressure of the springs 35 against freely turning, are caused, by the rotation of the screw 30 and the nut 31, to travel laterally in one direction or the other, depending on the direction of rotation of the handwheel. When the gear 27 travels laterally, the teeth thereon enter between the teeth of one of the gears 24—25, the gear 24 for instance, and the gear 27 is then held against turning by the load on the worm shaft 14 until the left end of the nut 31 strikes the left collar 32 as shown in Fig. 5. Being thus prevented from traveling, the nut 31 and gear 27 rotate as one with the shaft 29 and drive the gear 24 and the slow-speed shaft 14 to operate the valve.

When the gear 27 moves laterally as above described, a yoke 37, straddling the gear and carried on a rod 38 mounted to slide in the casing, moves laterally with it, and in so doing removes a cam 39 carried by the rod 38 away from an actuating plunger 40 of an electric switch 41 to open the motor or automatic control circuit and prevent power operation of the valve until the gear 27 and yoke 37 return to normal position shown in Fig. 1.

As long as the operator maintains operating force on the handwheel 28, the latter remains geared to the valve-actuating mechanism. When, however, the operator releases the handwheel, the spring 35, which was placed under compression in the operation as above described, forces the gear 27 and nut 31 laterally, and, since the helix angle of the screw 30 is sufficiently great, the screw 30 is rotated, and with it the shaft 29 and handwheel 28, until the gear 27 reaches its intermediate position shown in Fig. 1, where it is disengaged from both the gears 24 and 25.

The parts being duplicated on opposite sides of the normal position of the gear 27, regardless of the direction of rotation of the handwheel, the latter becomes coupled to the valve-actuating mechanism and remains coupled so long as the operator maintains operating force on the handwheel.

To crack-open by hand a stuck or stiff valve sometimes requires a hammer blow.

For this purpose, there is provided a pair of lugs 42 on the wormwheel 16 and on a disk (not shown) on the valve stem 17 respectively. When the valve is seated, these lugs are in engagement, and, of course, when unseating the valve by retrograde motion of the parts, the lug 42 which is on the wormwheel 16 moves through almost a complete revolution before it strikes the other lug 42, and this produces a hammer-blow to crack open the valve.

In a modification of the invention shown in Fig. 6, special means are provided for holding the gear 27 more firmly against rotation until the teeth thereon enter the teeth of either the gear 24 or the gear 25. For this purpose, the spring cups 33a are held against rotation.

This is accomplished by providing for each of the spring cups 33a, a flanged sleeve 60 which is secured to the adjacent portion of the casing. The sleeve 60 has slots 61 engaged by inwardly extending ears 62 on the spring cup 33a. Hence, the cups 33a may slide longitudinally but cannot rotate, and thus, through the action of the springs 35, rotation-retarding pressure is applied to the gear 27.

To further retard the tendency of the gear 27 to rotate with the screw during the initial movement thereof, the gear 27 may be provided with notches 63 at each side thereof, in which are held captive balls 64 fitting in notches 65 in the upturned flanges 34 of the spring cups. A detent action is thus provided between the nonrotating spring cups and the gear 27 so as to hold the gear 27 against turning until either end of the nut 31 is engaged by one of the stop collars 32, whereupon the balls 64 slip by the notches 65 in the spring cups and the gear 27 may turn.

In the form of the invention illustrated in Figs. 2 and 3, instead of coupling the handwheel to the worm shaft by longitudinal movement of the manually driven gearing, this is accomplished by arcuate movement.

In this form of the invention, the worm shaft 14 has secured on its outer end a gear 41 in position to be engaged either by a gear 42 or a gear 43 carried by a drum 44 rotatably mounted on a casing extension 45 on trunnions 46. Coaxial with the drum 44 and rotatably mounted thereon is a shaft 47 having keyed to its outer end the handwheel or pulley 28. Also secured to the shaft 47 is a gear 48 in constant mesh with the gears 42 and 43, which are rotated thereby when the handwheel is rotated. The drum 44 carries at one end a lever 49 connected to a spring 50, the other end of which is anchored on a part of a casing 51 so as to hold the lever and drum in an immediate position A, indicated by dot-and-dash lines in Fig. 3. This is the normal position of the parts when the device is under motor control, the gears 42 and 43 being at opposite sides of the gear 41 on the worm shaft 14.

In order to connect the handwheel to the actuating mechanism when it is desired to operate the control by hand, the handwheel is provided with a friction-clutch disk 52 splined on the shaft 47 and a spring 53, pressing the disk against the end of the drum and tending to cause rotation of the drum with the handwheel from the neutral position to an operating position in which either the gear 42 or the gear 43 meshes with the gear 41, depending on the direction of operation of the handwheel. In such operating positions, the lever 49 strikes an abutment 54 on the casing so that, during the continued application of manually applied driving force to the handwheel, the drum 44 will remain stationary and the gears 48, 42 and 43 will be rotated by the handwheel to drive the gear 41 and thus open or close the valve according to the direction of rotation.

As either the gear 42 or the gear 43 moves into mesh with the gear 41, the lever 49 engages cut-out switches 55 and 56, either of which, upon being operated, opens the circuit controlling the power operation of the valve so that such operation unwittingly initiated may not cause injurious results.

When the lever 49 moves from its normal or idle position A, Fig. 3, in either direction, it increases the tension of the spring 50 which constantly tends to return it. Hence, as soon as the operator relinquishes his grasp of the handwheel or allows reverse movement to take place, the spring restores the drum with its gears 42 and 43 to normal inoperative position where the handwheel is disconnected from the valve-actuating mechanism and the switch 55 or switch 56 reset to permit power operation of the valve.

In the above description and in the claims, the wheel 28 has been referred to as a handwheel. It should be understood, of course, that the wheel 28 may be operated by a handle 66 alone, or that the periphery of the wheel may be provided with means 67 to be engaged by a chain 68 in case the handwheel is located so high above the floor that the handwheel cannot be conveniently reached.

Variations and modifications may be made within the scope of this invention and portions of the improvements may be used without others.

I claim:

1. In a valve control having motor-operated valve-actuating mechanism including a valve driving shaft; a gear on said shaft; a handwheel; a gear driven by said handwheel and normally out of mesh with said gear on the driving shaft; a drum operated by the handwheel and carrying said hand-driven gear; a yielding driving connection between the handwheel and said drum adapted upon initial operation of said drum to arcuately move the hand-driven gear carried thereby into engagement with the gear on the driving shaft; means for limiting the movement of said drum when said gears are in mesh so that the operation of the handwheel will cause the said gears to operate and move the valve; and a spring placed under tension when the drum is rotated to cause said gears to mesh and acting to cause reverse rotation of said drum and unmeshing of the gears when manually applied torque is removed from the handwheel.

2. In a valve control having motor-operated valve-actuating mechanism including a valve driving shaft; a gear on said shaft; a handwheel; a pair of angularly spaced gears driven by the handwheel and each of which is normally out of mesh with said gear on the driving shaft; a drum operated by the handwheel and carrying said hand-driven gears; a yielding driving connection between the handwheel and said drum adapted upon initial rotation of said drum in one direction or the other to move one of said hand-driven gears carried thereby into engagement with the gear on said driving shaft; means for limiting the movement of said drum when said gears are in mesh so that the operation of the handwheel will cause the said meshed gears to operate and open or close the valve depending on the direction of rotation of the drum and handwheel; and spring means placed under load when the drum is rotated to cause said gears to mesh and acting to cause reverse rotation of said drum and unmeshing of the gears when manually applied torque is removed from the handwheel.

3. In a valve control having motor-operated valve-actuating mechanism including a valve driving shaft; a gear on said shaft; a handwheel; a pair of angularly spaced gears driven by the handwheel and each of which is normally out of mesh with said gear on the driving shaft; a drum operated by the handwheel and carrying said hand-driven gears; a yielding driving connection between the handwheel and said drum adapted upon initial rotation of said drum in one direction or the other to move one of said hand-driven gears carried thereby into engagement with the gear on said driving shaft; means for limiting the movement of said drum when said gears are in mesh so that the operation of the handwheel will cause the said meshed gears to operate and open or close the valve depending on the direction of rotation of the drum and handwheel; and a single spring placed under tension when the drum is rotated in either direction to cause said gears to mesh and acting to return said drum to intermediate position and cause unmeshing of the gears when manually applied torque is removed from the handwheel.

ERWIN J. PANISH.